United States Patent [19]

Wakihira et al.

[11] Patent Number: 4,756,650
[45] Date of Patent: Jul. 12, 1988

[54] TWIST DRILL

[75] Inventors: Koichiro Wakihira, Kobe; Michitaka Katsuta, Hyogo; Masayasu Hino, Hyogo; Kouhei Matsumoto, Hyogo; Yoshio Nakahara, Hyogo; Tosio Sasayama, Hyogo, all of Japan

[73] Assignee: Kabushiki Kaisha Kobe Seiko Sho, Kobe, Japan

[21] Appl. No.: 935,516

[22] Filed: Nov. 26, 1986

[51] Int. Cl.$^4$ .............................................. B23B 51/02
[52] U.S. Cl. ..................................... 408/230; 408/227
[58] Field of Search ............... 408/230, 227, 229, 144, 408/145

[56] References Cited

U.S. PATENT DOCUMENTS

| 262,588 | 8/1882 | Hartshorn | 408/230 |
|---|---|---|---|
| 472,541 | 4/1892 | Johnson | 408/230 |
| 750,537 | 1/1904 | Hanson | 408/230 |
| 2,778,252 | 1/1957 | Oxford, Jr. | 408/230 |
| 3,667,857 | 6/1972 | Shaver et al. | 408/230 |
| 4,222,690 | 9/1980 | Hosoi | 408/230 |
| 4,605,347 | 8/1986 | Jodock et al. | 408/230 |
| 4,688,972 | 8/1987 | Kubota | 408/230 |

FOREIGN PATENT DOCUMENTS

| 2653117 | 5/1978 | Fed. Rep. of Germany | 408/230 |
|---|---|---|---|
| 48511 | 4/1980 | Japan | 408/230 |
| 3117 | 1/1981 | Japan | 408/144 |
| 21711 | 2/1981 | Japan | 408/144 |
| 58-18163 | 2/1983 | Japan . | |
| 242907 | 12/1985 | Japan | 408/145 |
| 61-30845 | 6/1986 | Japan . | |
| 1432546 | 4/1976 | United Kingdom | 408/230 |
| 1151375 | 4/1985 | U.S.S.R. | 408/227 |

Primary Examiner—Gil Weidenfeld
Assistant Examiner—Daniel W. Howell
Attorney, Agent, or Firm—Oblon, Fisher, Spivak, McClelland & Maier

[57] ABSTRACT

A twist drill including a body characterized by the outer portion of each of the heels bulging toward the main flute as compared with that of the standard twist drill, the main lips each bulging in a triangular shape in cross section toward the main flute as compared with that of the standard twist drill, and a subflute having a substantially U-shaped cross section and axially formed in the inner portion adjacent to the axis of the twist drill of each of the heels along the main flute for a predetermined distance from the tip.

7 Claims, 5 Drawing Sheets

TWIST DRILL

BACKGROUND OF THE INVENTION

1. Field of the Invention

The present invention relates to twist drills and, more specifically, to a twist drill with a thick web not requiring thinning.

2. Description of the Prior Art

Recently, it has been strongly desired to enhance the efficiency of the twist drilling process and to improve drilling accuracy. Generally, twist drills having enhanced rigidity are employed for improving drilling efficiency.

As illustrated in FIG. 1, a twist drill 1 having an enhanced rigidity has a web of increased thickness, as compared with the web of a standard twist drill indicated by broken lines, formed by expanding the margin lips 3 and the heels 4 to enhance rigidity. Such a twist drill having a thick web, however, has a chisel edge longer than that of the standard twist drill, and hence the center axis of rotation of the twist drill is liable to deviate from a correct position so as to deteriorate the drilling accuracy due to walking, the cutting performance is deteriorated due to an increased cutting resistance, particularly, the thrust. Accordingly, it is usual practice to subject such a twist drill having a thick web to a thinning process to shorten or to remove the chisel edge as illustrated in FIG. 2. Twist drills based on such conception are disclosed, for example, in Japanese patent publication Nos. 58-18163 and 61-30845. These known twist drills require high thinning skill because the thinning accuracy affects drilling accuracy directly. These known twist drills have a further problem in that they need to be subjected to a thinning process after each regrinding.

Furthermore, since the volume of the flutes of the known twist drills having a large web thickness is smaller than that of the standard twist drills, the chip removing performance thereof is deteriorated.

SUMMARY OF THE INVENTION

Accordingly, it is the primary object of the present invention to provide a twist drill having a small web thickness, a sufficient rigidity and a comparatively large flute volume, and not requiring thinning.

It is another object of the present invention to provide a twist drill capable of satisfactory chip removal.

It is a further object of the present invention to provide a twist drill capable of long life and excellent drilling accuracy According to the present invention, the peripheral portion of the heels and margin lips of a twist drill are bulged, as viewed in a cross section, as compared with those of the standard twist drill, and the central portions of the heels are recessed so that the rigidity of the twist drill is enhanced. That is, as viewed in a cross section perpendicular to the axis of the twist drill, the peripheral portion of the heel, namely, the heel corner, and the margin lip of the twist drill protrude into the main flute of the twist drill as compared with the standard heel corner and margin lip, which form a substantially smooth concave curvilinear surface, and a subflute having a U-shaped cross section is formed in the central portion of the heel along the main flute in a predetermined axial range from the tip of the twist drill.

Therefore, according to the present invention, in a cross section perpendicular to the axis of the twist drill, the peripheral portions of the heels bulge into the main flutes, while the margin lips bulge in a triangular shape into the main flutes, respectively, so that the cross-sectional area of the twist drill is increased, and hence the rigidity of the twist drill is enhanced.

Furthermore, since the subflute is formed in the tip of the twist drill, the size of the chisel edge is necessarily reduced, and hence thinning is unnecessary, the capability of leading into the workpiece is improved so as to obviate so-called walking and the thrust is reduced, so that the twist drill according to the present invention is capable of highly efficient and accurate drilling. Chips broken by the chisel edge are removed through the subflutes and the main flutes, part of the chips produced by the cutting edges is removed satisfactorily through the subflutes and the main flutes, while the remainder of the chips is removed satisfactorily through the main flutes.

A more complete appreciation of the invention and many of the attendant advantages thereof will be readily obtained as the same becomes better understood by reference to the following detailed description when considered in connection with the accompanying drawings, wherein:

DESCRIPTION OF THE PREFERRED EMBODIMENTS

Preferred embodiments of the present invention will be described hereinafter with reference to FIGS. 3 to 7.

Figure 1:
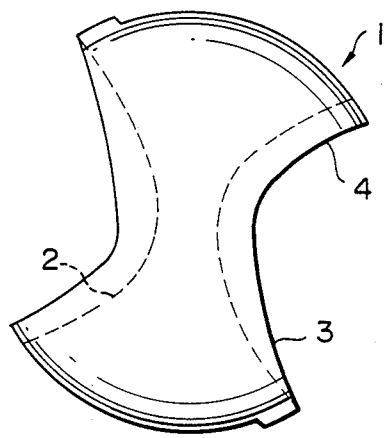
FIG. 1 is a sectional view of a conventional high-ridigity twist drill, showing a cross section perpendicular to the axis of the body of the twist drill.
Figure 2:
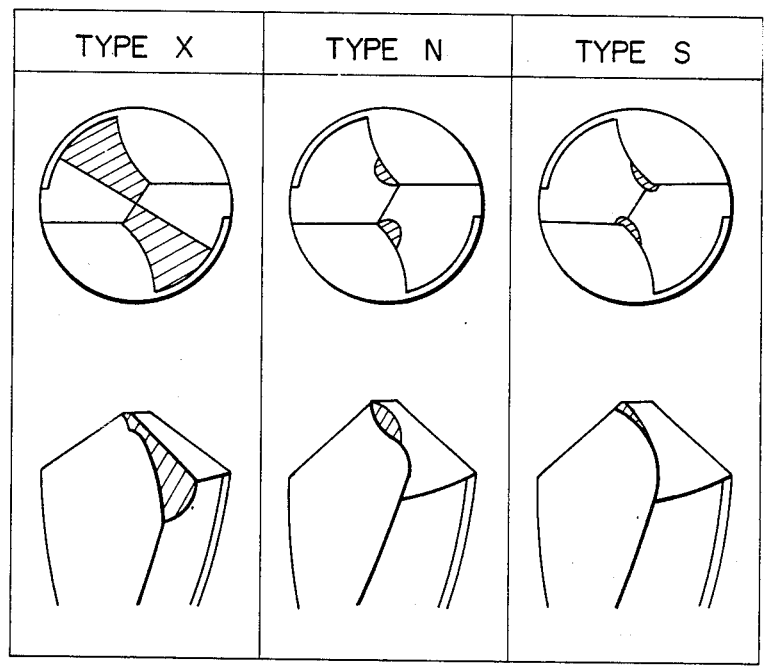
FIG. 2 is an illustration showing the tip portions of conventional twist drills in plan views and sectional views to explain the conventional known modes of thinning.
Figure 3:
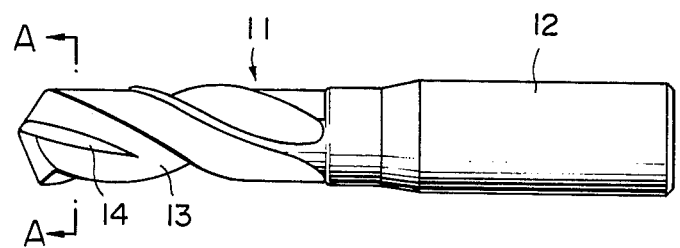
FIG. 3 is a front elevational view of a twist drill, in a first embodiment, according to the present invention.
Figure 4:
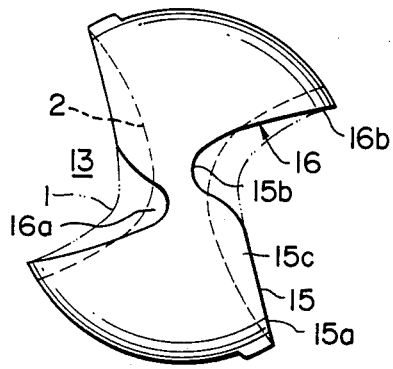
FIG. 4 is a sectional view taken on line A—A in FIG. 3.

Referring to FIG. 3 showing a twist drill 10 in a first embodiment, the twist drill 10 comprises a body 11 and a shank 12 similarly to the conventional twist drill. A pair of helical flutes (main flutes) 13 are formed in the body 11. A subflute 14 having a suitable length L is formed in the central portion of the main flute 13 from the tip of the twist drill toward the shank 12. As illustrated in FIG. 4 in a cross-sectional view, a triangular protrusion 15c is formed by bulging or extending the margin lip 15 into the main flute 13, which is apparent as compared with a standard twist drill 2 indicated by broken lines, and a high-rigidity twist drill 1 indicated by alternate long and two short dashes lines in FIG. 4, to provide a cross-sectional area greater than that of the standard twist drill 2. That is, the outer portion 15a of each margin lip 15 bulges similarly to the high-rigidity twist drill 1. On the other hand, the inner portion 15b of each margin lip 15 is recessed inward from the inner portion of the margin lip of the high-rigidity twist drill 1 to form a web of a small thickness.

The outer portion 16b of each heel 16 bulges into the main flute 13 similarly to the high-rigidity twist drill 1, and a recess 16a of a U-shaped cross section is formed between the outer portion 16a and the inner portion of the heel 16. This recess 16a serves as the subflute 14. The subflutes 14 are formed, as mentioned above, in a predetermined range from the tip of the twist drill 10. This range corresponds to the regrinding range of the cutting edges of the twist drill 10.

Figure 5:
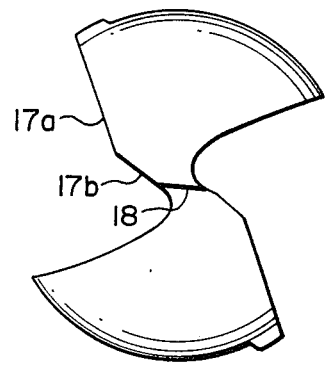
FIG. 5 is an end view of the twist drill of FIG. 3.

Thus, the thickness of the land between the margin lip 15 and the outer portion 16b of the heel 16 of the twist drill 10 is greater than that of the standard twist drill 2, while the web thickness of the twist drill 10 is smaller than those of the high-rigidity twist drill 1 and the standard twist drill 2. Accordingly, when the twist drill 10 is sharpened, two cutting edges 17a and 17b on each land, and one comparatively small chisel edge 18 are formed as illustrated in FIG. 5 in end view. Therefore, the twist drill 10 has improved biting capability, and is capable of accurate drilling without so-called walking. Furthermore, the thrust on the twist drill 10 is reduced, and the two cutting edges 17a and 17b on each land reduces the cutting resistance.

Chips cut from a workpiece by the cutting edges 17a and 17b are guided by the rake faces into chip removing flutes each consisting of the main flute 13 and the subflute 14 for smooth removal, while chips broken by the chisel edge 18 are removed through the subflutes 14, and then through the main flutes 13. As mentioned above, since the subflutes 14 are formed in the predetermined range in the front and of the twist drill 10, the same chisel edge 18 is always formed when the twist drill 10 is reground, so that thinning is not necessary at all.

Figure 6:
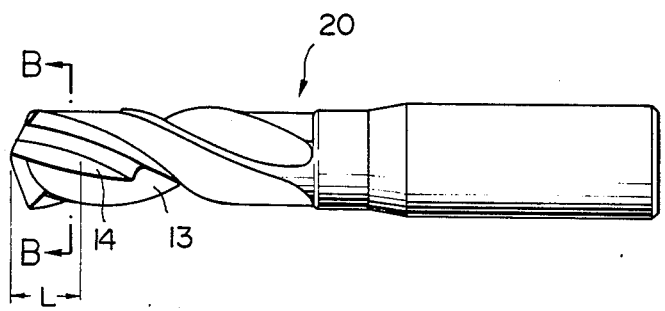
FIG. 6 is a front elevational view of a twist drill, in a second embodiment, according to the present invention.
Figure 7:
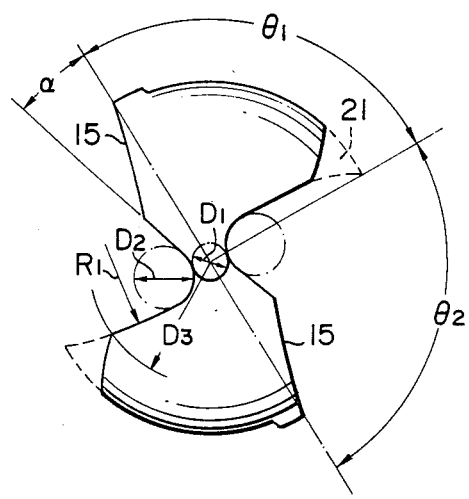
FIG. 7 is a sectional view taken on line B—B in FIG. 6.

Referring to FIG. 6 showing a twist drill 20, in a second embodiment, according to the present invention, the twist drill 20 has chip removing flutes similar to those of the twist drill 10 but greater in size than those of the twist drill 10. As illustrated in FIG. 7, the heel corners 21 of the twist drill 20 are cut off along the main flutes 13 by a length slightly greater than that of the subflutes 14.

Thus, the chip removing flutes have an increased volume, which facilitates removal of chips and remarkably improves the flow of a cutting fluid to the tip of the twist drill. Although it was expected that cutting off the heel corners might reduce the rigidity of the twist drill, it was proved that cutting-off the heel corners does not shorten the life of the twist drill.

FIG. 7 also illustrates the design data of the twist drill 20 as a twist drill for drilling various types of steel; 1:1 to 0.8:1 in the flute width ratio $\theta_2/\theta_1$, 0.33 D (D=drill diameter) in the web thickness of the parallel web, 10° to 15° in the angle 0 between a line connecting the respective outer edges of the margin lips 15 and a tangent line to the central curvilinear surface of the margin lip 15, 0.04 D to 0.11 D in the web thickness $D_1$ at the subflutes, 0.1 D to 0.2 D in the diameter $D_2$ of a circle touching the curvilinear bottom surface of the subflute between the margin lip 15 and the heel 16, 0.5 D to 0.8 D in the radius of curvature $R_1$ of the curvilinear inner portion of the heel 16, and 0.85 D in the diameter $D_3$ of a circle with its center on the center of the twist drill and passing each boundary between the outer portion of the heel 16 and the subflute 14.

The web thickness at the subflutes 14 at the tip of the twist drill is 0.04 D to 0.11 D and the web has a taper of 2 to 6 mm/100 mm. The axial length L of the subflutes 14 is 0.4 D to 1.1 D, which enable the twist drill 20 to be reground the same number of times as the conventional twist drill.

The conventional high-rigidity twist drill 1 for drilling steels has a flute width ratio of 0.8:1 to 0.9:1 and a web thickness of 0.2 D to 0.45 D, and hence thinning is indispensable. The standard twist drill 2 for various types of steel has a flute width ratio of 1.3:1 to 1:1 and a web thickness of 0.1 D to 0.2 D, and hence occasional thinning is necessary.

The twist drill 20 in the second embodiment is provided with subflutes 14 in the heels 16, respectively, the web thickness of the twist drill 20 is smaller than those of the standard twist drill 2 and high-rigidity twist drill 1, and hence the size of the chisel edge thereof is reduced accordingly. Accordingly, the twist drill 20 is capable of accurate drilling without so-called walking, the cutting resistance is reduced, and the twist drill 20 does not need thinning, the workmanship of which affects the drilling accuracy of the twist drill. Furthermore, thinning for each regrinding is not necessary; it is necessary only to sharpen the edges at the tip of the twist drill 20 for satisfactory drilling. Since the subflute 14 is formed in the inner portion of the heel 16 and the heel corners are cut off, the chip removing flutes of the twist drill 20 are larger than those of the conventional high-rigidity twist drill 1 and the standard twist drill 2 and chips are guided smoothly along the curvilinear surface of the outer portion 15a of the triangular protrusion 15c of the margin lip 15. Thus, the twist drill 20 is capable of improved chip removing performance. Since the outer portion 16b of the heel 16 bulges and the triangular protrusion 15c is formed in the margin lip 15 to form a wide land, the rigidity of the twist drill 20 is enhanced without increasing the web thickness. Still further, since the web thickness of the twist drill 20 is small, the sectional area of the chip removing flute of the twist drill 20 is greater than those of the high-rigidity twist drill 1 and the standard twist drill 2, and hence the twist drill 20 is capable of improved chip removing performance.

The present invention is not limited to the foregoing embodiment, but may be embodied in various modifications.

Furthermore, in order to extend the life of the twist drill, the edges of the twist drill may be coated with a hard film of the nitride, carbide or carbide-nitride of a IV-group metal through the PVD process or the CVD process.

FIGS. 8 to 11 show the results of drilling tests of the twist drill 20 in the second embodiment, coated with a TiN film through the PVD process, in comparison with the standard drill.

Figure 8:
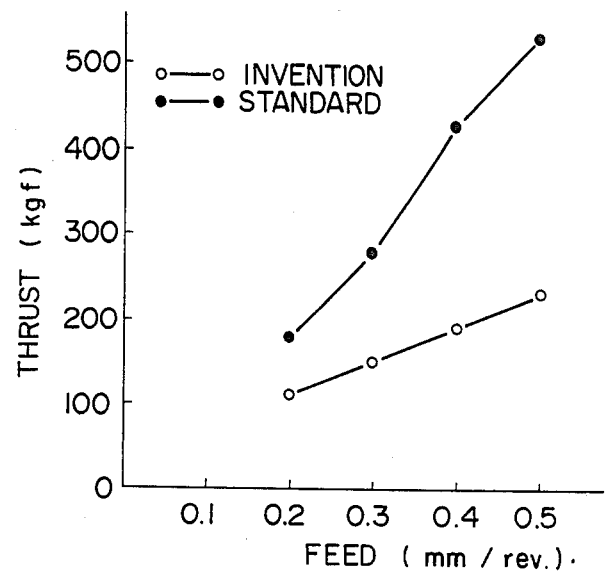
FIGS. 8 to 11 are graphs showing the results of drilling tests.

FIG. 8 is a graph showing the variation of thrust with feed. The test conditions are as follows: drill diameter: 10 mm, drilling speed: 25 m/min, type of material drilled: S50C (JIS), hardness of the material drilled: $H_B$ 220–240, depth of hole (blind): 20 mm, and cutting fluid: soluble oil (emulsion).

Figure 9:
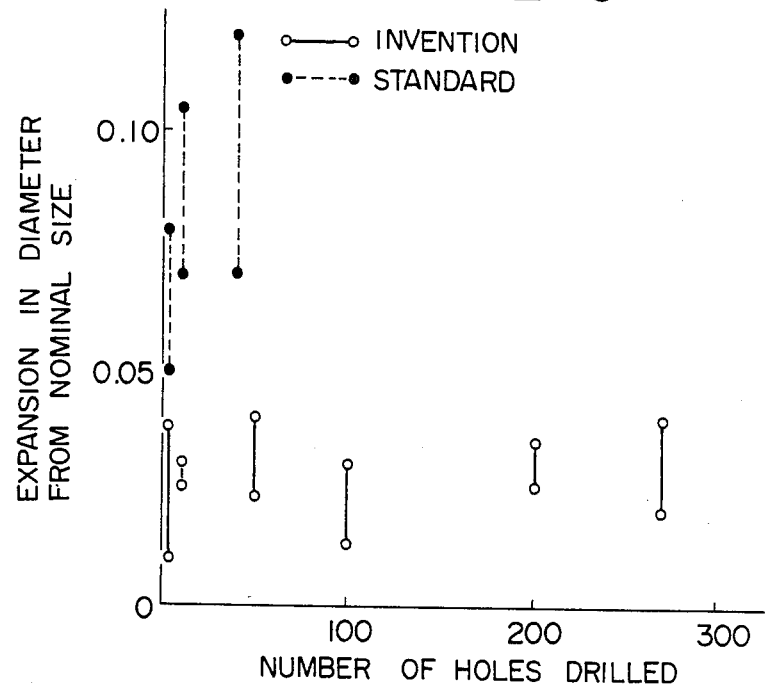

FIG. 9 is a graph showing the expansion of holes in diameter from the minimal size for the number of holes drilled with one twist drill when the feed is 0.15 mm/rev.

Figure 10:
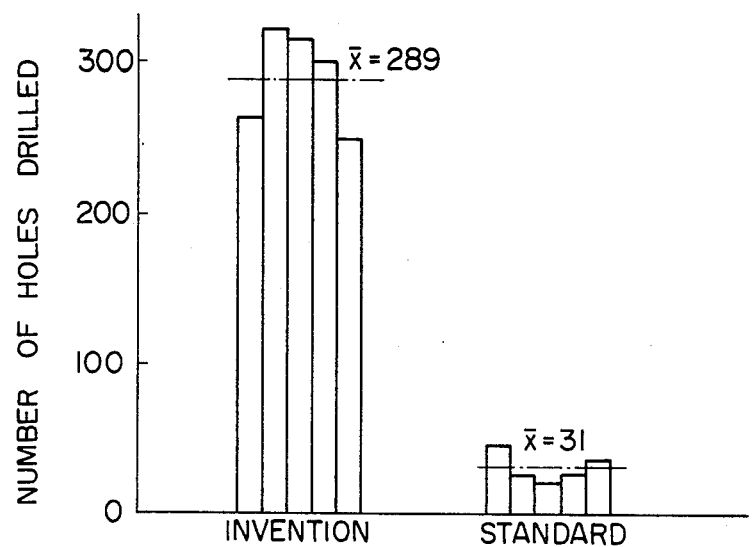
Figure 11:
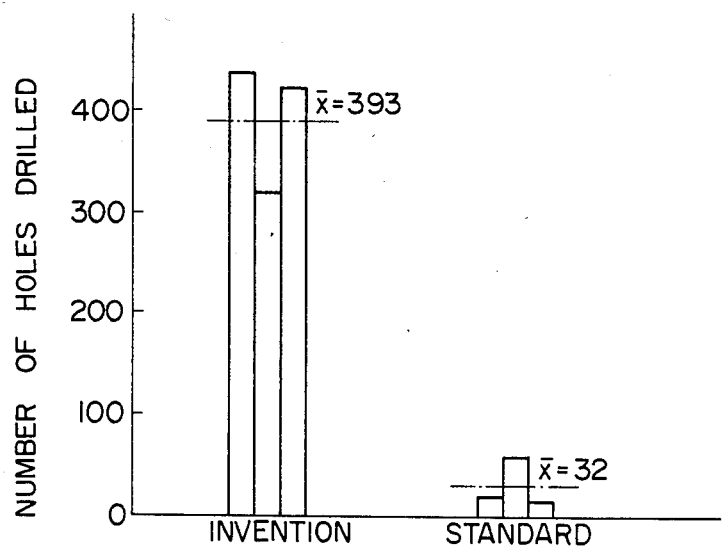

FIGS. 10 and 11 are graphs showing, by comparison, the life of the twist drill of the present invention and the standard twist drill. The test conditions for FIG. 10 are: drill diameter: 5 mm, drilling speed: 25 m/min, feed: 0.15 mm/rev., kind of material drilled: S50C (JIS), hardness of the material drilled: $H_B$ 240-250, depth of hole (through): 16 mm, and cutting fluid: soluble oil (emulsion). Test conditions for FIG. 11 are: drill diameter: 10 mm, drilling speed: 15 m/min, feed: 0.15 mm/rev., kind of material drilled: SKD61 (JIS), hardness of the material drilled: $H_B$ 298-321, depth of hole (through): 20 mm, and cutting fluid: soluble oil (emulsion).

As is obvious from the results of the tests, the twist drill of the present invention is capable of highly accurate and stable drilling, and the life thereof is nine to twelve times that of the standard twist drill.

The back taper on the diameter of the twist drills subjected to the tests was 0.06 mm/100 mm. However, when the twist drill is coated with a hard film, preferably the back taper on the diameter for the peripheral portion corresponding to the portion in which the subflutes 14 are formed in 0.1 to 0.4 mm/100 mm, because excessively small back taper on diameter causes rapid wear of the hard film due to abrasion between the periphery of the twist drill and the wall of the hole drilled in the work. A back taper on the diameter greater than the upper limit of the above-mentioned range deteriorates the drilling accuracy of the twist drill.

Obviously, numerous modifications and variations of the present invention are possible in light of the above teachings. It is therefore to be understood that within the scope of the appended claims, the invention may be practiced otherwise than as specifically described herein.

What is claimed is:

1. A twist drill, comprising: a body, the margin lips thereof each extending in a triangular shape in cross section toward a main flute, and a subflute having a substantially U-shaped cross section and axially formed in an inner portion thereof adjacent to the axis of the twist drill along the main flute for a predetermined distance from a tip thereof wherein the web thickness of said subflute at a tip of said twist drill is 0.04 to 0.11 times the diameter of the drill and the axial length of said subflute is 0.4 to 0.11 times the diameter of the drill and wherein the back taper of a diameter at least of a portion of the circumference corresponding to a portion including the subflute is in the range of 0.1 to 0.4 mm/100 mm.

2. A twist drill as recited in claim 1, wherein respective heel corners are cut off along the main flutes, respectively.

3. A twist drill as recited in claim 1, wherein the cutting edges comprise cutting edges coated with a hard film.

4. A twist drill as recited in claim 3, wherein the hard film comprises a film of one or a combination of nitrides, carbides and carbide-nitrides of metals of IV-group.

5. A twist drill as recited in claim 3, wherein said hard film comprises a PVD process film.

6. A twist drill having a flute width ratio of 0.8 to 1.7 and a web thickness of 0.25 D to 0.4 D wherein D is the drill diameter, said drill comprising:
   a main flute; and
   a subflute provided in said main flute wherein the length of said subflute is 0.4 D to 1.1 D from a tip portion of said twist drill, the web thickness of said subflute is 0.4 D to 0.11 D and wherein the back taper of a diameter at least of a portion of the circumference corresponding to a portion including the subflute is in the range of 0.1 to 0.4 mm/100 mm.

7. The twist drill as set forth in claim 6, wherein the main flute has heel corner portions thereof removed along a length slightly greater than that of the subflute.

* * * * *

UNITED STATES PATENT AND TRADEMARK OFFICE
CERTIFICATE OF CORRECTION

PATENT NO. : 4,756,650
DATED : July 12, 1988
INVENTOR(S) : KOICHIRO WAKIHIRA ET AL.

It is certified that error appears in the above-identified patent and that said Letters Patent is hereby corrected as shown below:

Column 6, Claim 1, line 6, change "0.11" to --1.1--;

Signed and Sealed this

Tenth Day of January, 1989

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO.  : 4,756,650
DATED       : July 12, 1988
INVENTOR(S) : Koichiro Wakihira et al.

It is certified that error appears in the above-identified patent and that said Letters Patent is hereby corrected as shown below:

Column 6, Claim 1, line 6, change "0.11" to read -- 1.1 --.

Column 6, Claim 6, line 30, change "0.4D" to read -- 0.04D --.

This certificate supersedes Certificate of Correction issued January 10, 1989.

Signed and Sealed this

Twenty-fifth Day of April, 1989

Attest:

DONALD J. QUIGG

Attesting Officer

Commissioner of Patents and Trademarks